US010754196B2

(12) United States Patent
Watanabe et al.

(10) Patent No.: US 10,754,196 B2
(45) Date of Patent: Aug. 25, 2020

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Youzou Kyoukane, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/255,637

(22) Filed: Jan. 23, 2019

(65) Prior Publication Data

US 2019/0227384 A1      Jul. 25, 2019

(30) Foreign Application Priority Data

Jan. 24, 2018   (JP) .................................. 2018-009911

(51) Int. Cl.
*G02F 1/13357* (2006.01)
(52) U.S. Cl.
CPC .. *G02F 1/133611* (2013.01); *G02F 1/133603* (2013.01); *G02F 1/133605* (2013.01); *G02F 1/133606* (2013.01)
(58) Field of Classification Search
CPC ......... G02F 1/133603; G02F 1/133605; G02F 1/133606; G02F 1/133611
See application file for complete search history.

(56) References Cited

U.S. PATENT DOCUMENTS

| 2006/0215386 | A1* | 9/2006 | Hatanaka | G02B 5/0242 362/97.1 |
| 2007/0086181 | A1 | 4/2007 | Hatanaka et al. | |
| 2009/0003002 | A1* | 1/2009 | Sato | G02B 6/0043 362/341 |
| 2011/0051044 | A1* | 3/2011 | Segawa | G02F 1/133606 349/64 |
| 2011/0261286 | A1* | 10/2011 | Choi | G02F 1/133611 349/61 |
| 2012/0218752 | A1* | 8/2012 | Sumitani | F21V 11/14 362/235 |
| 2012/0327330 | A1* | 12/2012 | Takahashi | G02B 5/0221 349/61 |

(Continued)

FOREIGN PATENT DOCUMENTS

JP        2005-117023 A      4/2005

*Primary Examiner* — Zheng Song
(74) *Attorney, Agent, or Firm* — ScienBiziP, P.C.

(57) ABSTRACT

A lighting device includes a reflector including a unit light source region, a light reflecting portion, and a light transmissive portion. The unit light source region includes a light source overlapping region and a light source peripheral region. The light reflecting portion is included in the unit light source region and has a higher area ratio in the light source overlapping region than in the light source peripheral region. The light transmissive portion is included in the unit light source region and has a higher area ratio in the light source peripheral region than in the light source overlapping region. The unit light source region includes unit regions arranged to cover a plane surface of the unit light source region and the light reflecting portion and the light transmissive portion are allocated to the unit regions to have a non-point-symmetric distribution in the unit light source region.

18 Claims, 12 Drawing Sheets

(56) References Cited

U.S. PATENT DOCUMENTS

| | | | |
|---|---|---|---|
| 2013/0148333 A1* | 6/2013 | Ha | G02B 19/0061 362/97.2 |
| 2014/0204578 A1* | 7/2014 | Kim | F21V 11/16 362/235 |
| 2016/0298828 A1* | 10/2016 | Chang | G02F 1/133606 |
| 2017/0160591 A1* | 6/2017 | Cho | G02B 5/0257 |

* cited by examiner

FIG.5

| 86 | 22 | 19 | 26 | 54 | 62 | 16 | 66 | 91 | 30 | 46 | 31 | 93 | 63 | 49 | 93 | 55 | 16 | 62 | 27 |
|---|---|---|---|---|---|---|---|---|---|---|---|---|---|---|---|---|---|---|---|
| 41 | 59 | 45 | 17 | 35 | 5 | 1 | 91 | 99 | 99 | 27 | 21 | 84 | 75 | 96 | 49 | 38 | 79 | 30 | 89 |
| 31 | 40 | 37 | 27 | 77 | 7 | 75 | 10 | 33 | 82 | 18 | 75 | 66 | 25 | 45 | 3 | 40 | 62 | 2 | 58 |
| 33 | 66 | 33 | 80 | 85 | 70 | 9 | 3 | 49 | 15 | 69 | 21 | 72 | 81 | 39 | 24 | 60 | 31 | 64 | 62 |
| 52 | 12 | 37 | 64 | 18 | 72 | 58 | 95 | 11 | 95 | 96 | 54 | 77 | 82 | 57 | 16 | 100 | 34 | 18 | 17 |
| 70 | 85 | 96 | 81 | 85 | 94 | 33 | 66 | 23 | 21 | 91 | 56 | 70 | 68 | 4 | 83 | 78 | 32 | 25 | 75 |
| 86 | 83 | 32 | 89 | 88 | 31 | 4 | 75 | 58 | 32 | 98 | 30 | 26 | 20 | 96 | 32 | 6 | 81 | 20 | 55 |
| 49 | 49 | 87 | 41 | 73 | 23 | 81 | 26 | 26 | 58 | 94 | 48 | 23 | 15 | 39 | 13 | 90 | 33 | 95 | 98 |
| 79 | 33 | 73 | 73 | 99 | 72 | 28 | 77 | 10 | 66 | 14 | 98 | 14 | 46 | 98 | 62 | 54 | 84 | 18 | 96 |
| 1 | 81 | 66 | 88 | 46 | 6 | 90 | 93 | 89 | 98 | 37 | 5 | 47 | 79 | 39 | 93 | 58 | 27 | 32 | 24 |
| 70 | 44 | 22 | 3 | 4 | 63 | 73 | 2 | 15 | 44 | 56 | 95 | 91 | 13 | 27 | 6 | 65 | 30 | 57 | 33 |
| 51 | 66 | 35 | 55 | 5 | 11 | 38 | 77 | 33 | 80 | 90 | 44 | 47 | 57 | 68 | 59 | 61 | 96 | 38 | 49 |
| 46 | 38 | 12 | 77 | 90 | 91 | 31 | 91 | 85 | 72 | 10 | 81 | 90 | 57 | 93 | 55 | 29 | 2 | 96 | 4 |
| 90 | 7 | 42 | 91 | 92 | 59 | 97 | 82 | 14 | 100 | 49 | 35 | 80 | 47 | 72 | 76 | 93 | 48 | 29 | 99 |
| 85 | 31 | 17 | 2 | 18 | 31 | 86 | 32 | 91 | 14 | 13 | 66 | 38 | 63 | 56 | 10 | 98 | 28 | 77 | 78 |
| 9 | 59 | 6 | 41 | 37 | 50 | 44 | 28 | 79 | 33 | 70 | 58 | 94 | 57 | 63 | 25 | 43 | 49 | 75 | 84 |
| 75 | 5 | 47 | 91 | 70 | 100 | 4 | 2 | 78 | 59 | 77 | 72 | 54 | 19 | 74 | 76 | 75 | 11 | 93 | 74 |
| 13 | 60 | 3 | 65 | 100 | 49 | 8 | 70 | 68 | 14 | 60 | 15 | 3 | 92 | 93 | 93 | 17 | 89 | 89 | 98 |
| 51 | 35 | 40 | 42 | 98 | 28 | 77 | 35 | 17 | 100 | 3 | 19 | 14 | 17 | 98 | 46 | 2 | 52 | 47 | 27 |
| 59 | 72 | 33 | 43 | 20 | 28 | 39 | 17 | 34 | 64 | 60 | 83 | 27 | 64 | 28 | 93 | 6 | 25 | 27 | 39 |

FIG.8

| DISTANCE OD | 0% EXAMPLE 1 | 10% EXAMPLE 2 | 20% EXAMPLE 3 | 30% COMPARATIVE EXAMPLE 1 | 40% COMPARATIVE EXAMPLE 1 | 50% COMPARATIVE EXAMPLE 1 |
|---|---|---|---|---|---|---|
| 2.5mm | × | × | × | × | × | × |
| 3mm | ○ | × | × | × | × | × |
| 3.5mm | ○ | ○ | ○ | × | × | × |
| 4mm | ○ | ○ | ○ | ○ | ○ | × |
| 4.5mm | × | ○ | ○ | ○ | ○ | ○ |
| 5mm | × | × | ○ | ○ | ○ | ○ |

AREA RATIO Se

LIGHTING DEVICE AND DISPLAY DEVICE

CROSS REFERENCE TO RELATED APPLICATION

This application claims priority from Japanese Patent Application No. 2018-009911 filed on Jan. 24, 2018. The entire contents of the priority application are incorporated herein by reference.

TECHNICAL FIELD

The technology described herein relates to a lighting device and a display device.

BACKGROUND

A conventional example of a backlight device used in a liquid crystal display device and the like includes cold-cathode tubes, and a diffusion plate disposed in the direction in which the cold-cathode tubes emit light. The diffusion plate is printed with a dimming dot pattern that has a total light transmittance of 62% to 71% and a haze value of 90% to 99%. The dimming dot pattern includes dots that are arranged at positions dividing the interval of the cold-cathode tubes into 24 parts to 48 parts. The diameter of the dots varies from 0.16 mm to 0.7 mm in accordance with the distance from the cold-cathode tubes. Such a backlight device is described in Japanese Unexamined Patent Application Publication No. 2005-117023.

In the backlight device described in Japanese Unexamined Patent Application Publication No. 2005-117023, the dimming dot pattern has a regular and point-symmetric distribution on a plate surface of diffusion plate. Accordingly, the light emitted from the cold-cathode tubs has a simple luminance distribution due to the point-symmetric dimming dot pattern. As a result, light-dark unevenness (luminance unevenness) has tended to become readily visually recognizable. In particular, when the distance between the light source and the diffusion plate is reduced, or the diffusion plate is made thinner in order to achieve a decrease in thickness, luminance unevenness has become more likely to be visible.

SUMMARY

The technology described herein was made in view of the above circumstances. An object is to suppress the occurrence of luminance unevenness.

A lighting device according to the technology described herein includes a light source and a reflector through which at least a part of light rays emitted by the light source pass and disposed at an interval from the light source. The reflector includes on a plate surface thereof a unit light source region, a light reflecting portion, and a light transmissive portion. The unit light source region includes a light source overlapping region overlapping the light source and a light source peripheral region around the light source overlapping region. The light reflecting portion is configured to reflect the light rays and included in the unit light source region so as to have a higher area ratio in the light source overlapping region than in the light source peripheral region. The light transmissive portion is configured to transmit the light rays and included in the unit light source region so as to have a higher area ratio in the light source peripheral region than in the light source overlapping region. The unit light source region includes unit regions that are arranged to cover a plane surface of the unit light source region and the light reflecting portion and the light transmissive portion are allocated to the unit regions so as to have a non-point-symmetric distribution in the unit light source region.

In this way, the light emitted by the light source either directly passes through the light transmissive portion of the light reflector, or is reflected by the light reflecting portion, passes through the light transmissive portion, and then exits to the outside. In the unit light source region of the reflector, the area ratio of the light reflecting portions is high and the area ratio of the light transmissive portion is low in the light source overlapping region. On the other hand, in the light source peripheral region, the area ratio of the light reflecting portion is low and the area ratio of the light transmissive portion is high. Accordingly, the exit of light from the light source overlapping region is suppressed, while the exit of light from the light source peripheral region is promoted. In this way, the amount of exit light is made uniform.

The unit light source region is segmented into unit regions arranged in a plane-filling manner. The light reflecting portion and the light transmissive portion are allocated to the unit regions so as to have a non-point-symmetric distribution in the unit light source region. Accordingly, the luminance distribution of the exit light in the unit light source region becomes non-point-symmetric. Thus, compared to if the distribution of the light reflecting portion and the light transmissive portion in the unit light source region were point-symmetric, the luminance distribution of the exit light becomes complex and smooth as a whole. Accordingly, luminance unevenness becomes less readily visually recognizable.

According to the technology described herein, the occurrence of luminance unevenness can be suppressed.

BRIEF DESCRIPTION OF THE DRAWINGS

FIG. 5 is a schematic diagram depicting the relationship between unit regions configuring the outer end region and random number values that have been set.

FIG. 8 is a table showing the results of determination of luminance unevenness when, in comparative experiment 2, the distance between the LEDs and the reflector was changed with respect to the backlight device according to Comparative Examples 1 to 3 and Examples 1 to 3.

DETAILED DESCRIPTION

First Embodiment

Figure 1:
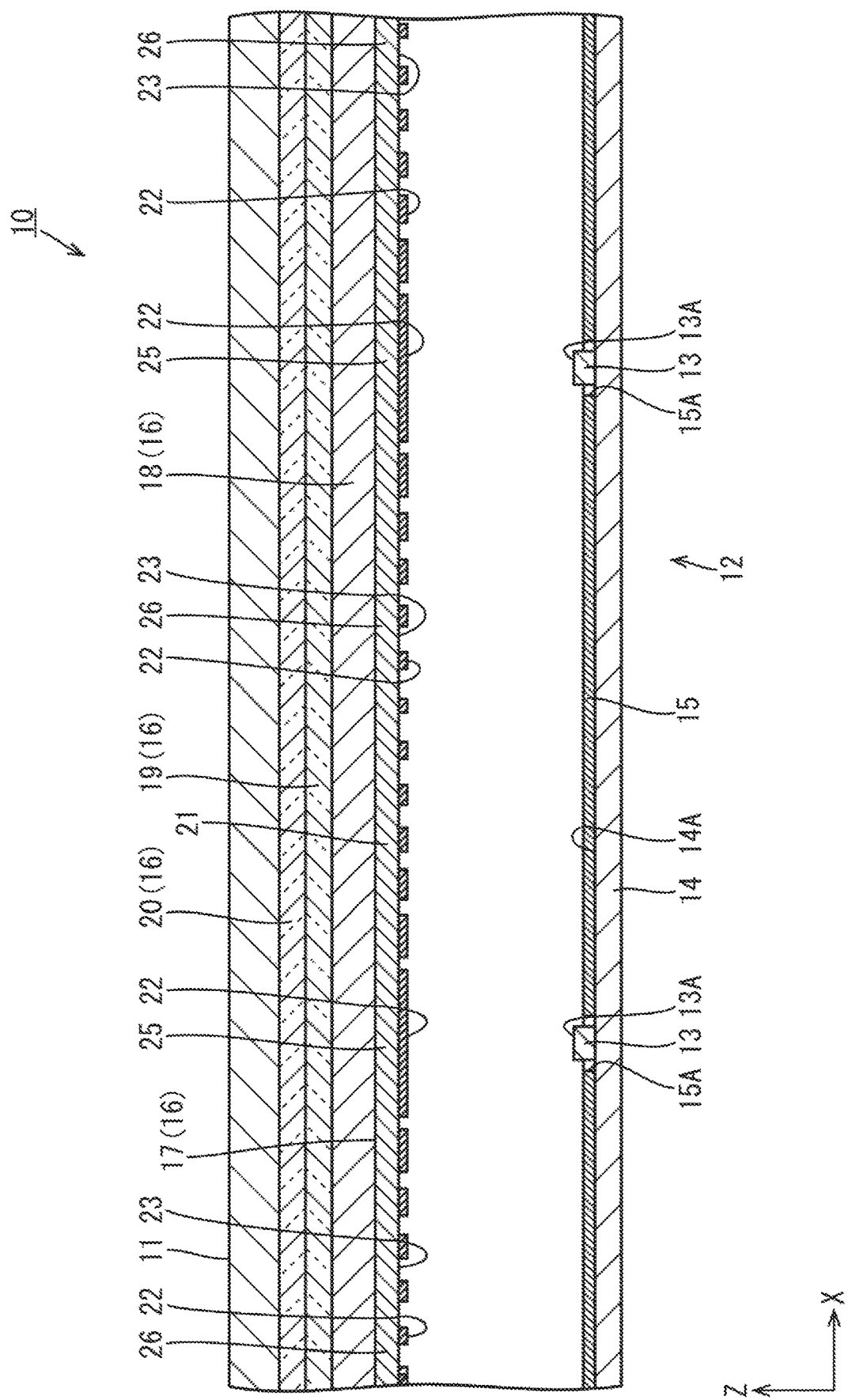
FIG. 1 is a cross sectional view of a liquid crystal display device according to the first embodiment.

A first embodiment of the technology described herein will be described with reference to FIGS. 1 to 8. In the present embodiment, a liquid crystal display device (display device) 10 will be described by way of example. In some of the drawings, the X-axis, the Y-axis, and the Z-axis are indicated, the respective axial directions corresponding to the directions shown in the drawings. The top of FIG. 1 corresponds to the front side, and the bottom corresponds to the back side.

As illustrated in FIG. 1, the liquid crystal display device 10 includes, at least, a liquid crystal panel (display panel) 11 configured to display an image, and a backlight device (lighting device) 12. The backlight device 12 is an external light source which is disposed on the back side (light entry side) with respect to the liquid crystal panel 11, and which irradiates the liquid crystal panel 11 with light for a display. The liquid crystal panel 11 includes a pair of glass substrates bonded to each other with a predetermined gap therebetween, with liquid crystal sealed between the glass substrates. One of the glass substrates (an array substrate, an active matrix substrate) is provided with switching elements (such as TFTs) which are connected to source wires and gate wires orthogonal to each other, pixel electrodes connected to the switching elements, and an alignment film and the like. The other glass substrate (counter substrate, CF substrate) is provided with an alignment film and the like, in addition to a color filter having a predetermined arrangement of colored portions of R (red), G (green), B (blue) and the like, and a black matrix partitioning the color filter. A polarizing plate is disposed on the outer side of each glass substrate.

The backlight device 12 will be described. As illustrated in FIG. 1, the backlight device 12 includes LEDs 13 serving as a light source; an LED substrate (light source substrate) 14 on which the LEDs 13 are mounted; a reflecting sheet 15 which is disposed so as to cover the surface of the LED substrate 14 and which reflects light; and optical member 16 which are opposed to the LEDs 13 with an interval therebetween. Thus, the backlight device 12 according to the present embodiment is the so-called direct type in which the LEDs 13 are disposed immediately under the liquid crystal panel 11 and the optical member 16. Preferably, the backlight device 12 has a rectangular frame for holding the outer peripheral ends of the optical member 16. In the following, the components of the backlight device 12 will be described.

Figure 2:
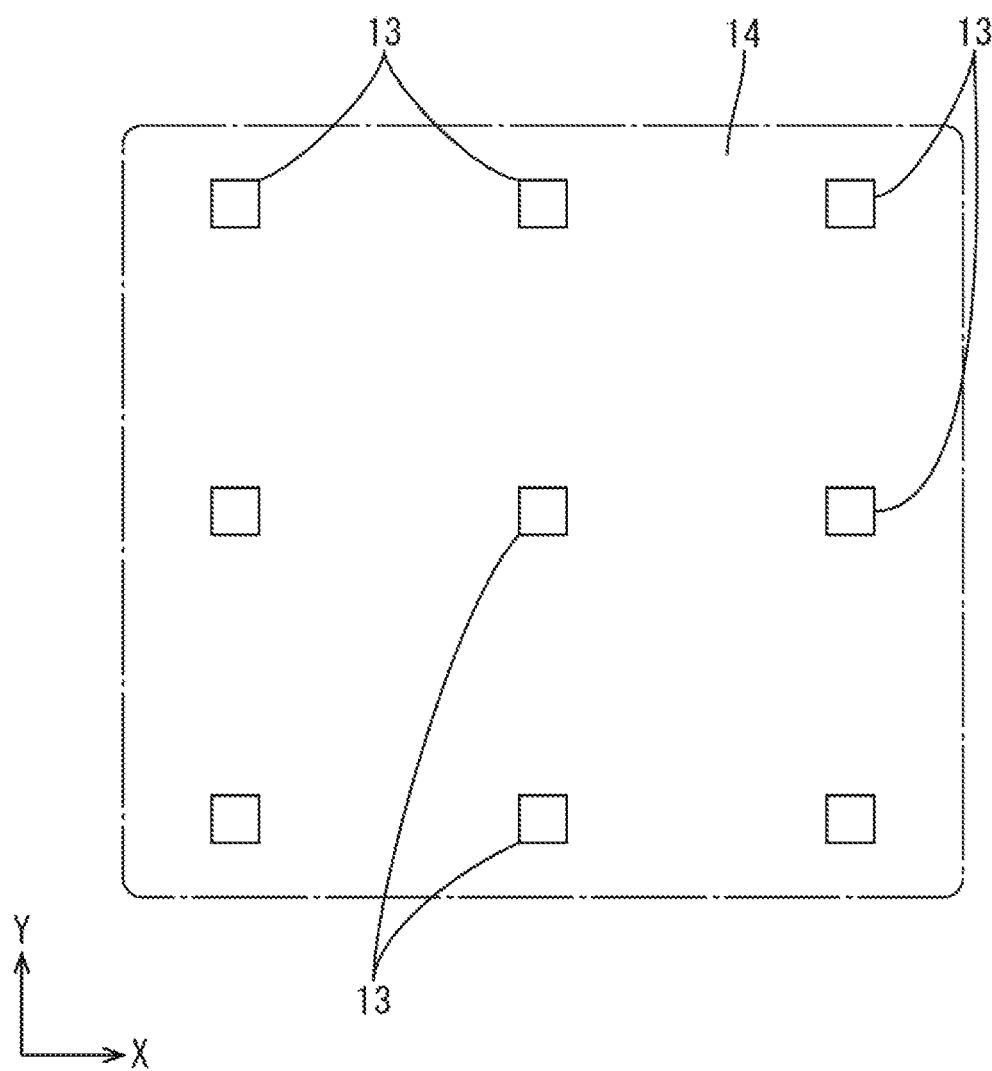
FIG. 2 is a plan view illustrating a planar arrangement of LEDs on an LED substrate of a backlight device provided in the liquid crystal display device.

As illustrated in FIG. 1 and FIG. 2, LEDs 13 are disposed side by side at intervals in each of the X-axis direction and the Y-axis direction within the plate surface of the LED substrate 14, forming a matrix (in rows and columns). The LEDs 13 are mounted on the plate surface on the front side of the LED substrate 14, with a light emitting surface 13A facing the opposite side (front side) from the LED substrate 14 side. Thus, the LEDs 13 are of the so-called top-emitting type. The LEDs 13 are positioned with the light emitting surface 13A opposing the plate surface of the optical member 16. The LEDs 13 include LED chips (LED elements), which are semiconductor light emitting elements, and a sealing material. The LED chips are disposed on a substrate portion fixedly attached to the plate surface of the LED substrate 14, and are sealed thereon with the sealing material. The LED chips emit light of the single color of blue, for example, and the sealing material contains phosphors (such as yellow phosphor, green phosphor, and red phosphor) dispersed and blended therein, so that the LEDs 13 emit white light as a whole.

As illustrated in FIG. 1, the LED substrate 14 has a plate shape with a plate surface parallel with the plate surfaces of the reflecting sheet 15 and the optical member 16. The LED substrate 14 includes a plate surface on the front side that is opposed to the plate surfaces of the reflecting sheet 15 and the optical member 16. The plate surface on the front side of the LED substrate 14 forms a mount surface 14A on which the LEDs 13 are mounted. The mount surface 14A of the LED substrate 14 is formed with wiring made of a metal film such as copper foil. The wiring is used to supply power to the LEDs 13.

The reflecting sheet 15 is made of synthetic resin, and has a white surface for high optical reflectivity. As illustrated in FIG. 1, the reflecting sheet 15 is layered so as to cover substantially the entire area of the mount surface 14A of the LED substrate 14 from the front side. The reflecting sheet 15 includes LED passing holes 15A formed at positions overlapping the respective LEDs 13 to separately pass the respective LEDs 13. LED passing holes 15A are disposed side by side at intervals in each of the X-axis direction and the Y-axis direction, forming a matrix aligned with the LEDs 13 in the LED substrate 14.

As illustrated in FIG. 1, the optical member 16 has a plate surface parallel with the plate surfaces of the liquid crystal panel 11 and the LED substrate 14, for example. The optical member 16 is interposed between the liquid crystal panel 11 and the LEDs 13 with respect to the Z-axis direction. The optical member 16 has the function of allowing the light emitted from the LEDs 13 to exit toward the liquid crystal panel 11 while providing the light with a predetermined optical action. The optical member 16 includes a back-side plate surface opposing the mount surface 14A of the LED substrate 14, and a front-side plate surface opposing the liquid crystal panel 11. The back-side plate surface provides a light entry surface for the entry of light. The front-side plate surface provides a light exit surface for the exit of light. The optical member 16 includes four layers disposed one upon another, including, in order from the back side, a reflector 17, a diffusion plate 18, a first lens sheet 19, and a second lens sheet 20. The diffusion plate 18 includes a base material of substantially transparent synthetic resin in which a number of diffusing particles for diffusing light are dispersed and blended. The two lens sheets 19, 20 each include a base material of substantially transparent synthetic resin, and a number of unit lenses which extend in the X-axis direction or the Y-axis direction and which are provided side by side on a plate surface of the base material with respect to a direction (the Y-axis direction or the X-axis direction) orthogonal to the direction of extension. The lens sheets 19, 20 provide incident light with a light collecting action selectively with respect to the direction in which the unit lenses are arranged.

Figure 3:
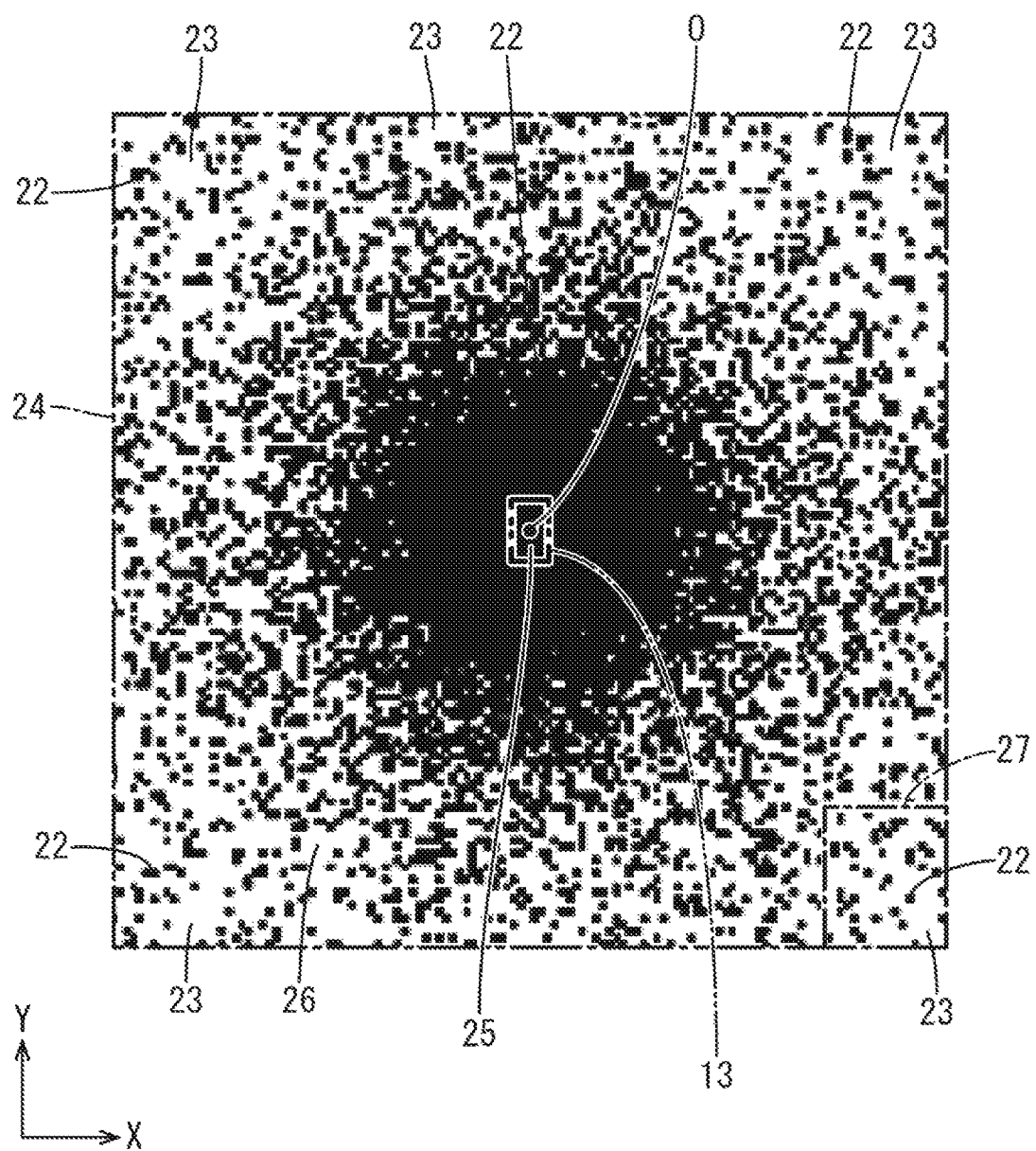
FIG. 3 is a plan view of a unit LED region in a reflector.

The reflector 17 will be described. As illustrated in FIG. 1, the reflector 17 includes a transmissive substrate 21 that is opposed to the LEDs 13 with an interval therebetween on the front side. The transmissive substrate 21 has a plate surface on which light reflecting portions 22 for reflecting light are provided. In FIG. 1, the distribution of the light reflecting portions 22 (light transmissive portions 23) is schematically depicted. The transmissive substrate 21 is made of substantially transparent synthetic resin (such as acrylic resin), and is transmissive to light (visible light rays). Accordingly, the portions of the transmissive substrate 21 in which the light reflecting portions 22 are not formed provide the light transmissive portions 23 that are transmissive to light. The transmissive substrate 21 is segmented into unit LED regions 24 that are separately associated with the LEDs 13 which are disposed in an overlapping manner within the plate surface of the transmissive substrate 21. As illustrated in FIG. 3, the unit LED regions 24 have a substantially square shape when viewed in plan, with each side having a length greater than the outline dimension of the LEDs 13, such as approximately 13.5 mm, for example. The unit LED regions 24 include a LED-overlapping region (light source overlapping region) 25 overlapping the LEDs 13 when viewed in plan, and an LED peripheral region (light source peripheral region) 26 that does not overlap the LEDs 13 when viewed in plan, and that is disposed around the LED-overlapping region 25.

The light reflecting portions 22 are made from white ink (white paint) for high optical reflectivity. The light reflecting portions 22 is formed on the back-side plate surface (light entry surface) of the transmissive substrate 21 by printing, such as screen printing, printing with an inkjet device or a dispenser device, or gravure printing. It is also possible to form the light reflecting portions 22 by depositing a metal thin film of metal material (such as aluminum or silver) on the plate surface of the transmissive substrate 21 by vapor deposition method (masked deposition). As illustrated in FIG. 3, the light reflecting portions 22 is patterned in the unit LED region 24 in such a way that the distribution changes in accordance with the distance from the center O (LEDs 13). Specifically, the light reflecting portions 22 is patterned in the unit LED region 24 such that the area ratio becomes relatively high in the LED-overlapping region 25 and relatively low in the LED peripheral region 26. Accordingly, the portions of the transmissive substrate 21 in which the light reflecting portions 22 are not formed are the light transmissive portions 23 and the light transmissive portions 23 have a distribution which is inversely correlated to that of the light reflecting portions 22 in the unit LED region 24 such that the area ratio becomes relatively low in the LED-overlapping region 25 and relatively high in the LED peripheral region 26. In this configuration, when the light emitted from the LEDs 13 reaches the reflector 17, more light is reflected toward the back side (LEDs 13 side) by the light reflecting portions 22 having the higher area ratio in the LED-overlapping region 25. On the other hand, in the LED peripheral region 26, the light transmissive portions 23 having the higher area ratio therein transmit the light toward the front side (light exit side). The light reflected by the light reflecting portions 22 may reach the reflector 17 again by being reflected by the reflecting sheet 15. In the process, some of the reflected light is transmitted through the light transmissive portions 23 toward the LED peripheral region 26. Thus, the exit of light is suppressed in the LED-overlapping region 25 in which the amount of light is inherently large, while the exit of light is promoted in the LED peripheral region 26 in which the amount of light is inherently small. In this way, the amount of exit light is made uniform.

Figure 4:
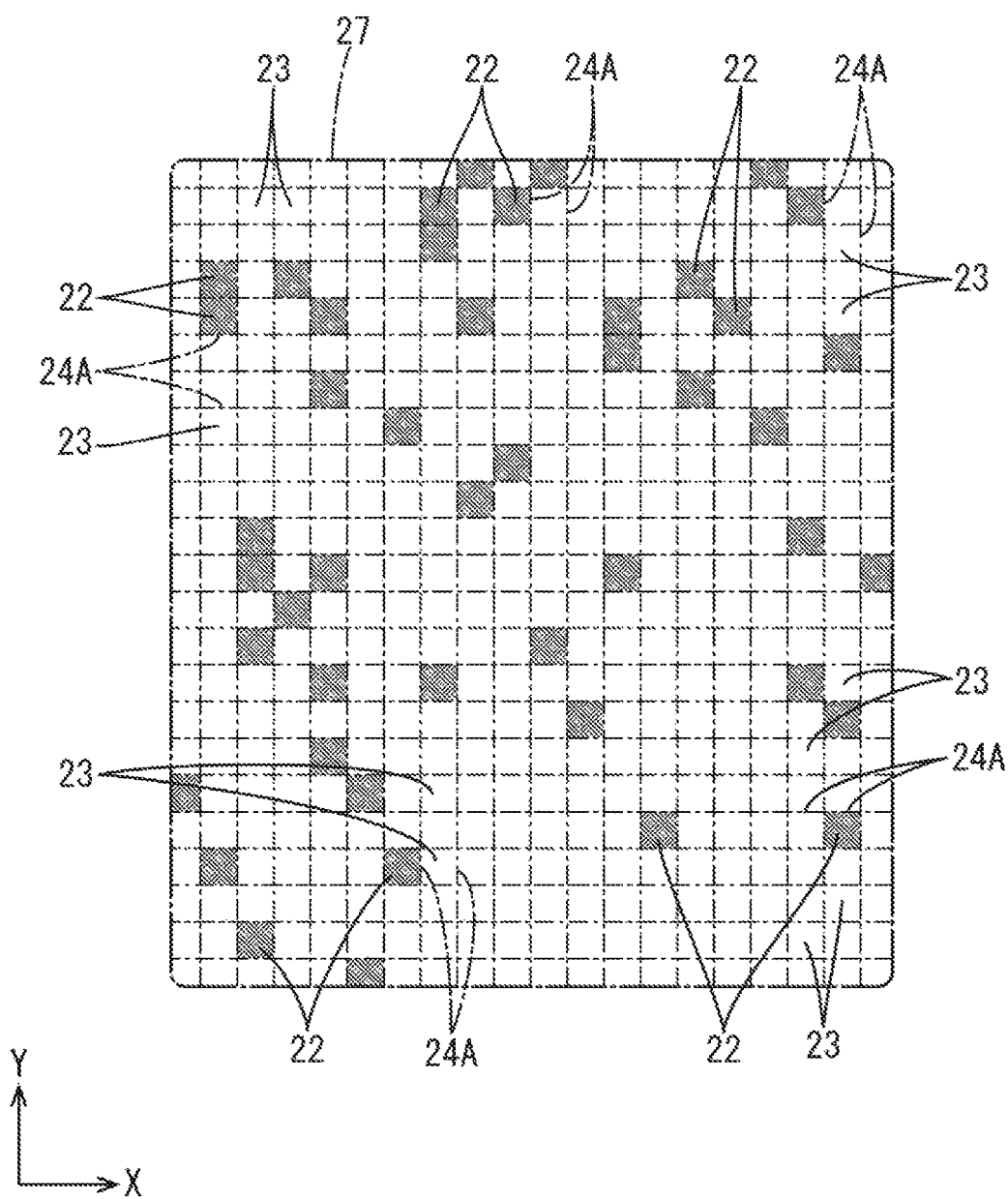
FIG. 4 is a plan view of an outer end region included in the unit LED region.

As illustrated in FIGS. 3 and 4, the unit LED regions 24 are segmented into unit regions 24A arranged in a plane-filling manner. FIG. 4 is a plan view illustrating an outer end region 27 (lower right-corner portion in FIG. 3) of the unit LED region 24 which is at the maximum distance from the center O and the farthest from the center O. The outer end region 27 includes unit regions 24A. The light reflecting portions 22 and the light transmissive portions 23 are allocated to the unit regions 24A so as to have a non-point-symmetric distribution in the unit LED region 24. Thus, due to the light reflecting portions 22 and the light transmissive portions 23 being non-point-symmetrically distributed in the unit LED region 24, the luminance distribution of the exit light in the unit LED region 24 becomes non-point-symmetric. Conventionally, the light reflecting portions and the light transmissive portions are point-symmetrically distributed in the unit LED region. As a result, the luminance distribution of the exit light in the unit LED region also becomes point-symmetric. This makes it more likely that the light-dark boundary becomes concentric, and the luminance unevenness becomes more likely to be visible. In contrast, when the luminance distribution of the exit light in the unit LED region 24 is non-point-symmetric, the light-dark boundary is discontinuously dispersed. As a result, the luminance distribution of the exit light becomes complex and smooth as a whole. In this way, the luminance unevenness becomes less readily visually recognizable.

Specifically, as illustrated in FIG. 3, the light reflecting portions 22 have a substantially 100% area ratio in the LED-overlapping region 25 of the unit LED regions 24. That is, the LED-overlapping region 25 is entirely covered by the light reflecting portions 22 and includes none of the light transmissive portions 23, of which the area ratio therein is substantially 0%. Accordingly, the light emitted from the LEDs 13 and travelling toward the LED-overlapping region 25 is substantially entirely reflected by the light reflecting portions 22 toward the back side, thus avoiding direct passage through the LED-overlapping region 25. Thus, the LEDs 13 are prevented from being directly visually recognized by the user, making the occurrence of luminance unevenness less likely in a more preferable manner. On the other hand, as illustrated in FIG. 4, the light reflecting portions 22 have an area ratio ranging from 0% to 20% in the outer end region 27 in the LED peripheral region 26 of the unit LED region 24. Specifically, the area ratio is 10% in the present embodiment, for example. In this way, the light reflecting portions 22 become less readily visually recognizable as dark portions, making luminance unevenness less likely to occur.

In the present embodiment, as illustrated in FIG. 4, the unit regions 24A have a substantially square planar shape with a constant outline dimension. In forming the light reflecting portions 22 on the plate surface of the transmissive substrate 21, if a printing process is used whereby an ink as the material of the light reflecting portions 22 is applied to the plate surface of the transmissive substrate 21, the ink applied onto the plate surface of the transmissive substrate 21 extends isotropically, resulting in a constant outline dimension of the light reflecting portions 22. By making the outline dimension of the unit regions 24A constant, it becomes possible to easily allocate the light reflecting portions 22 in the unit regions 24A using ink, and to provide high productivity. Preferably, the unit regions 24A to which the light reflecting portions 22 and the light transmissive portions 23 are allocated have an outline dimension in a range of from 0.05 mm to 0.5 mm. In the present embodiment, the outline dimension is on the order of 0.1 mm, for example. Thus, 135 unit regions 24A are disposed side by side in each of the X-axis direction and the Y-axis direction in the unit LED region 24, forming a matrix of a total of 18,225 unit regions 24A filling the plane of the unit LED region 24. If the outline dimension of the unit region were to be made less than 0.05 mm, it would become difficult to allocate the light reflecting portions 22 and the light transmissive portions 23 in the unit region by a printing process, for example. If the outline dimension of the unit region were to be greater than 0.5 mm, the light reflecting portions 22 or the light transmissive portions 23 allocated in the unit region would become too large and would tend to become readily visually recognizable as localized dark portions or bright portions. In this respect, if the outline dimension of the unit regions 24A is in the range of from 0.05 mm to 0.5 mm and the light reflecting portions 22 are formed by a printing process, for example, it becomes possible to easily allocate the light reflecting portions 22 and the light transmissive portions 23 to the unit regions 24A. In addition, the light reflecting portions 22 and the light transmissive portions 23 allocated to the unit regions 24A become less readily visually recognizable as localized dark portions or bright portions.

The light reflecting portions 22 and the light transmissive portions 23 are randomly allocated with respect to the unit regions 24A. Specifically, as illustrated in FIG. 5, for example, separately predetermined random number values are set in the unit regions 24A configuring the unit LED region 24. FIG. 5 is a schematic diagram illustrating the relationship between the unit regions 24A of the outer end region 27 and the random number values that are respectively set therein. The random number values are integers of 1 to 100 and are randomly set with respect to the unit regions 24A. The same random number value may be redundantly set in different unit regions 24A. In the outer end region 27, the area ratio of the light reflecting portions 22 is 10% as noted above. Accordingly, the light reflecting portions 22 are allocated to the unit regions 24A in which the random number values less than or equal to the area ratio, i.e., the random number values of 1 to 10, are set. The light transmissive portions 23 are allocated to the unit regions 24A in which the random number values greater than the above area ratio, i.e., the random number values of 11 to 100 are set. In this way, to the unit regions 24A, the light reflecting portions 22 are allocated with the probability of approximately 10%, and the light transmissive portions 23 are allocated with the probability of approximately 90%. With respect to the regions of the LED peripheral region 26 other than the outer end region 27, the area ratio of the light reflecting portions 22 may have values other than 10%. In this case, also, the light reflecting portions 22 may be allocated to the unit regions 24A in which random number values less than or equal to the area ratio of the light reflecting portions 22 are set, and the light transmissive portions 23 may be allocated to the unit regions 24A in which random number values greater than the area ratio are set. With respect to the LED-overlapping region 25, because the area ratio of the light reflecting portions 22 is 100%, the light reflecting portions 22 are allocated to all of the unit regions 24A in which the random number values are set to 1 to 100. Thus, the light reflecting portions 22 and the light transmissive portions 23 are randomly allocated to the unit regions 24A included in the unit LED regions 24. Accordingly, the light reflecting portions 22 and the light transmissive portions 23 are even less readily visually recognizable as localized dark portions or bright portions.

Figure 6:
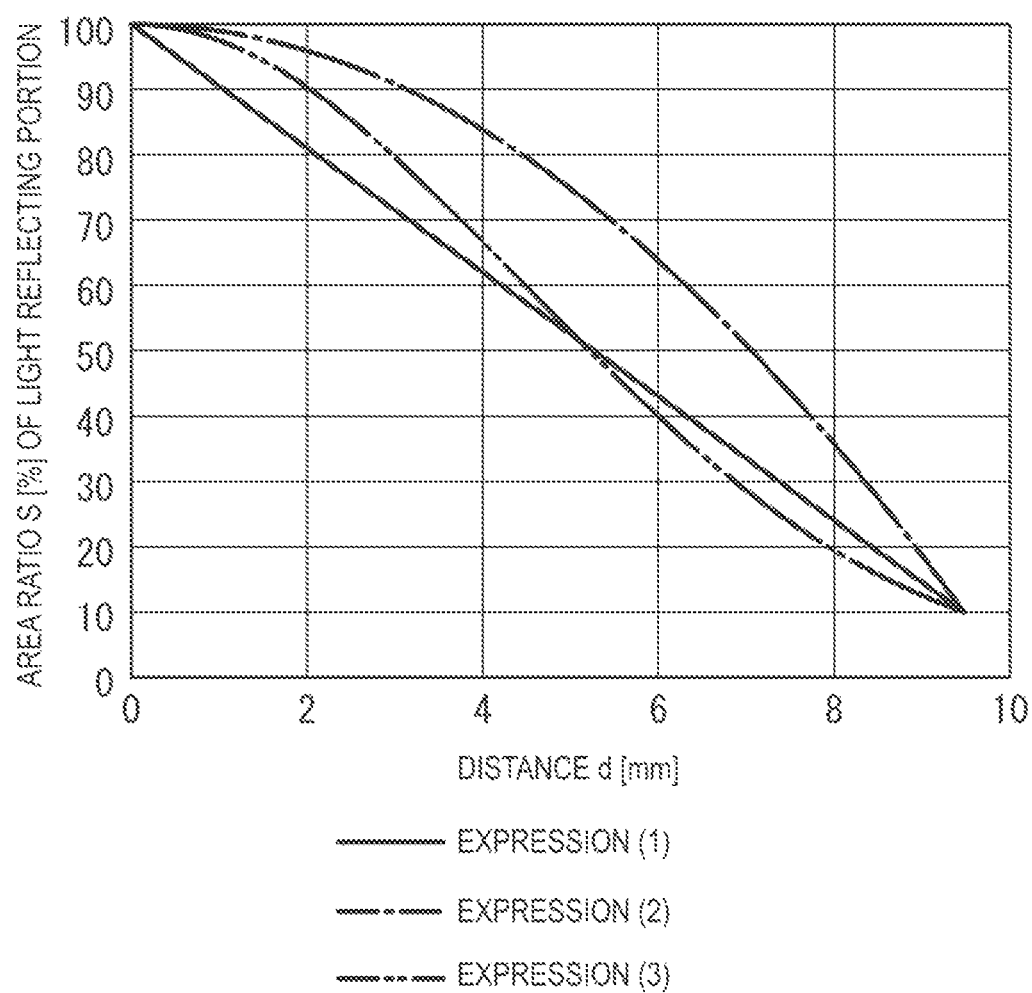
FIG. 6 is a graph depicting distributions relating to the area ratio of light reflecting portions based on expression (1) to expression (3).

The distribution of the area ratios of the light reflecting portions 22 and the light transmissive portions 23 allocated to the unit regions 24A included in the unit LED region 24 will be described. Specifically, in the unit LED region 24, the distribution is such that the area ratio of the light reflecting portions 22 is 100% with respect to the unit regions 24A included in the LED-overlapping region 25 while, with respect to the unit regions 24A included in the LED peripheral region 26, the area ratio of the light reflecting portions 22 decreases with increasing distance from the center O. Conversely, the distribution is such that the area ratio of the light transmissive portions 23 in the unit regions 24A included in the LED peripheral region 26 increases with increasing distance from the center O. More specifically, the area ratio of the light reflecting portions 22 is preferably determined based on any of the following expression (1) to expression (3). In expression (1) to expression (3), d is the distance from the center O of the unit LED region 24; de is the maximum distance from the center O of the unit LED region 24; Sc is the area ratio of the unit regions 24A positioned in the center O of the unit LED region 24; Se is the area ratio of the unit regions 24A having the maximum distance from the center O of the unit LED region 24; and S is the area ratio of the light reflecting portions 22 in the unit regions 24A. In the present embodiment, the unit LED region 24 is a square with each side measuring 13.5 mm. Accordingly, the maximum distance de from the center O is 9.48 mm, for example. In the present embodiment, the area ratio of the light reflecting portions 22 in the LED-overlapping region 25 is 100%. Accordingly, the area ratio Sc of the unit regions 24A positioned in the center O of the unit LED region 24 is 100%. In the present embodiment, the area ratio of the outer end region 27 included in the LED peripheral region 26 is 10%. Accordingly, the area ratio Se of the unit regions 24A having the maximum distance from the center O of the unit LED region 24 is 10%. Thus, the area ratio of the light reflecting portions 22 in the unit regions 24A positioned at the distance d from the center O of the unit LED region 24 is unambiguously determined based on expression (1) to expression (3). The distribution relating to the area ratio S of the light reflecting portions 22 based on expression (1) to expression (3) is depicted in the graph of FIG. 6. In FIG. 6, the vertical axis shows the area ratio S of the light reflecting portions 22, and the horizontal axis shows the distance d of the unit LED region 24 from the center O. According to expression (1), the area ratio S of the light reflecting portions 22 linearly changes with a change in the distance d from the center O of the unit LED region 24. According to expression (2), the area ratio S of the light reflecting portions 22 changes in a curving manner with a change in the distance d from the center O of the unit LED region 24, where the curve is a quadratic curve. According to expression (3), the area ratio S of the light reflecting portions 22 changes in a curving manner with a change in the distance d from the center O of the unit LED region 24, where the curve is a Gaussian curve.

$$S=(Se-100) \cdot d/de + Sc \quad (1)$$

$$S=(Se-100) \cdot d^2/de^2 + Sc \quad (2)$$

$$S=Sc \cdot \exp(d^2 \cdot \log(Se/100)/de^2) \quad (3)$$

Figure 7:
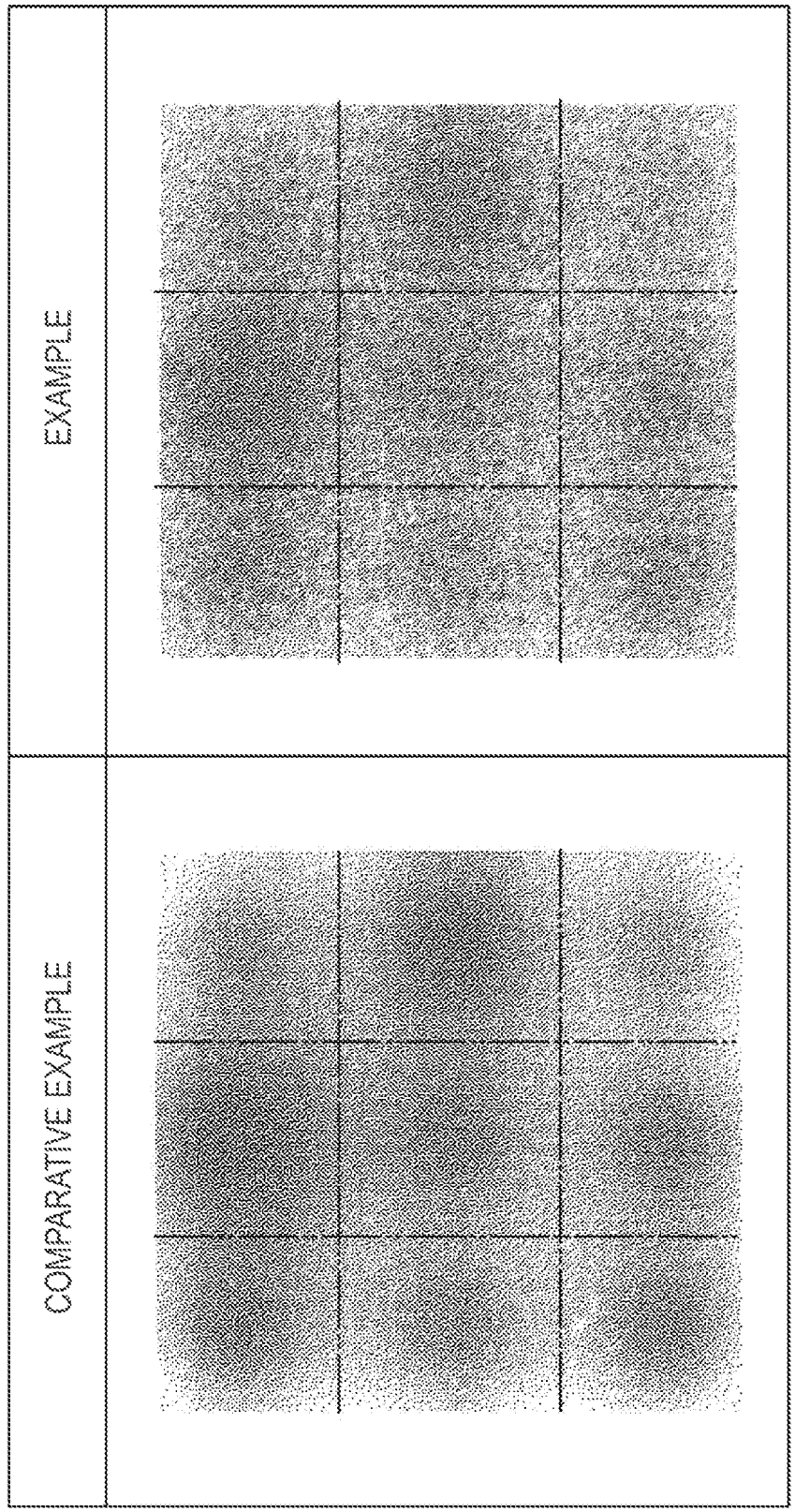
FIG. 7 shows photographs captured from the front side of the backlight devices according to a Comparative Example and an Example in comparative experiment 1.

In order to gain knowledge about the relationship between the symmetry relating to the distribution of the light reflecting portions 22 and the light transmissive portions 23 in the unit LED region 24 and the luminance distribution, comparative experiment 1 was conducted. In comparative experiment 1, the distribution of the light reflecting portions 22 and the light transmissive portions 23 in the unit LED region 24 was point-symmetric in a Comparative Example, and was non-point-symmetric in an Example. The backlight device 12 in the Example was as described above. The backlight device in the Comparative Example was similar to that described above, with the exception of the distribution of the light reflecting portions 22 and the light transmissive portions 23. FIG. 7 shows a table of photographs obtained by capturing images from the front side in a state in which the LEDs 13 of the respective backlight devices 12 according to the Comparative Example and the Example were turned on to emit light. Referring to FIG. 7, the photograph on the left is that of the Comparative Example, and the photograph on the right is that of the Example. Each of the photographs includes nine unit LED regions 24, with the boundary of adjacent unit LED regions 24 being indicated by dashed and double-dotted lines. In these photographs, the greater the amount of light and the higher the luminance, the higher the dot density becomes, and the smaller the amount of light and the lower the luminance, the lower the dot density becomes. The results of the experiment will be described. FIG. 7 indicates that in the Comparative Example, the luminance distribution relating to the exit light has high symmetry maintained by in each unit LED region, and that the light-dark boundary is generally concentric. Due to the concentric boundary, the light-dark luminance unevenness is more likely to be visible. On the other hand, in the Example, the symmetry in luminance distribution relating to the exit light of the unit LED regions 24 is lost, and that the light-dark boundary is discontinuously dispersed. The discontinuous boundary makes the luminance distribution of the exit light complex and smooth as a whole. Accordingly, it may be considered that the luminance unevenness is less likely to be visually recognized in the Example than in the Comparative Example.

In order to gain knowledge about the relationship between the area ratio Se of the light reflecting portions 22 in the outer end region 27 and the occurrence of luminance unevenness, a comparative experiment 2 was conducted. In the comparative experiment 2, the area ratio Se of the light reflecting portions 22 in the outer end region 27 was 0% in Example 1; the area ratio Se was 10% in Example 2; the area ratio Se was 20% in Example 2; the area ratio Se was 30% in Comparative Example 1; the area ratio Se was 40% in Comparative Example 2; and the area ratio Se was 50% in Comparative Example 3. In Example 2, the backlight device 12 was as described above. In Comparative Examples 1 to 3 and Example 1 to 3, the backlight device is similar to that described above, with the exception of the area ratio Se of the light reflecting portions 22 in the outer end region 27. In the backlight devices according to Comparative Examples 1 to 3 and Examples 1 to 3, the distance between OD between the LEDs 13 and the reflector 17 was changed from 2.5 mm to 5 mm at 0.5 mm intervals, and it was determined whether luminance unevenness was caused in the exit light. The results are shown in the table of FIG. 8. The determination of luminance unevenness was made visually by an inspector. Referring to FIG. 8, the circles indicate the absence of luminance unevenness, and the crosses indicate the presence of luminance unevenness. The results of the experiment will be described. FIG. 8 indicates that in Comparative Examples 1 to 3, luminance unevenness was visually recognized when the distance OD was less than or equal to 3.5 mm. Specifically, in Comparative Examples 1 and 2, no luminance unevenness was visually recognized when the distance OD was greater than or equal to 4 mm. In Comparative Example 3, no luminance unevenness was visually recognized when the distance OD was greater than or equal to 4.5 mm. On the other hand, in Examples 1 to 3, no luminance unevenness was visually recognized when the distance OD was 3.5 mm. Specifically, in Example 1, luminance unevenness was not visually recognized distance when the OD was in a range of from 3 mm to 4 mm. In Example 2, luminance unevenness was not visually recognized when the distance OD was in a range of from 3.5 mm to 4.5 mm. In Example 3, no luminance unevenness was visually recognized when the distance OD was greater than or equal to 3.5 mm. Thus, in Examples 1 to 3, compared to Comparative Examples 1 to 3, the luminance unevenness tended to become less readily visually recognized even when the distance OD was relatively small. Accordingly, it can be considered that Examples 1 to 3 are preferable when the thickness of the backlight device 12 is to be decreased while suppressing luminance unevenness.

As described above, according to the present embodiment, the backlight device (lighting device) 12 includes the LED (light source) 13 and the reflector 17 transmissive to at least some the light emitted from the LEDs 13. The reflector 17 is disposed at an interval from the LEDs 13, and includes, disposed on the plate surface thereof: the unit LED regions (unit light source region) 24 including the LED-overlapping region (light source overlapping region) 25 overlapping the LEDs 13, and the LED peripheral region (light source peripheral region) 26 disposed around the LED-overlapping region 25; the light reflecting portions 22 which are disposed in the unit LED regions 24 so as to have a higher area ratio in the LED-overlapping region 25 than in the LED peripheral region 26, and which reflect light; and the light transmissive portions 23 which are disposed in the unit LED regions 24 so as to have a higher area ratio in the LED peripheral region 26 than in the LED-overlapping region 25, and which is transmissive to light. The light reflecting portions 22 and the light transmissive portions 23, when the unit LED regions 24 when the unit LED regions 24 are segmented into unit regions 24A arranged in a plane-filling manner, are allocated to unit regions 24A so as to have a non-point-symmetric distribution in the unit LED regions 24.

In this way, the light emitted from the LEDs 13 either directly passes through the light transmissive portions 23 of the reflector 17, or is reflected by the light reflecting portions 22 and then passes through the light transmissive portions 23 and exits to the outside. In the unit LED regions 24 of the reflector 17, the area ratio of the light reflecting portions 22 is high and the area ratio of the light transmissive portions 23 is low in the LED-overlapping region 25. On the other hand, in the LED peripheral region 26, the area ratio of the light reflecting portions 22 is low and the area ratio of the light transmissive portions 23 is high. Accordingly, the exit of light from the LED-overlapping region 25 is suppressed while the exit of light from the LED peripheral region 26 is promoted, whereby the amount of exit light is made uniform.

The unit LED regions 24 are each segmented into the unit regions 24A arranged in a plane-filling manner. The light reflecting portions 22 and the light transmissive portions 23 are allocated to the unit regions 24A so as to have a non-point-symmetric distribution in the unit LED regions 24. Accordingly, the luminance distribution of the exit light from the unit LED regions 24 becomes non-point-symmetric. Thus, compared to if the distribution of the light reflecting portions and the light transmissive portions in the unit LED regions 24 were point-symmetric, the luminance distribution of the exit light becomes complex and smooth as a whole. Accordingly, luminance unevenness becomes less readily visually recognizable.

The unit regions 24A have an outline dimension in a range of from 0.05 mm to 0.5 mm. If the outline dimension of the unit region is smaller than 0.05 mm, it becomes difficult to allocate the light reflecting portions 22 and the light transmissive portions 23 to the unit regions by a printing process, for example. If the outline dimension of the unit region is greater than 0.5 mm, the light reflecting portions 22 and the light transmissive portions 23 allocated to the unit regions tend to become readily visually recognizable as localized dark portions or bright portions. In this respect, when the outline dimension of the unit regions 24A is in the range of from 0.05 mm to 0.5 mm, the light reflecting portions 22 and the light transmissive portions 23 can be easily allocated to the unit regions 24A by a printing process, for example. In addition, the light reflecting portions 22 and the light transmissive portions 23 allocated to the unit regions 24A become less readily visually recognizable as localized dark portions or bright portions.

The light reflecting portions 22 have the area ratio in a range of from 0% to 20% in the outer end region 27 which is included in the LED peripheral region 26 and which is at the maximum distance from the center O of the unit LED regions 24. If the area ratio of the light reflecting portions in the outer end region 27 is greater than 20%, the light reflecting portions 22 become more likely to be visible as dark portions, and luminance unevenness tends to be readily caused. In this respect, when the area ratio of the light reflecting portions 22 is in the range of from 0% to 20% in the outer end region 27, light reflecting portions 22 are less likely to be visually recognized as dark portions, making luminance unevenness less likely to occur. In this way, the thickness of the backlight device 12 can be decreased in a preferable manner.

The area ratio of the light reflecting portions 22 in the LED-overlapping region 25 of the unit LED regions 24 is 100%. In this way, the light transmissive portions 23 are not arranged in the LED-overlapping region 25. Accordingly, the light from the LEDs 13 is prevented from directly passing through the LED-overlapping region 25, whereby the LEDs 13 can be prevented from directly visually recognized by the user. In this way, luminance unevenness can be made difficult to occur in a more preferable manner.

The unit regions 24A have a constant outline dimension. When the light reflecting portions 22 are allocated to the unit regions 24A, by applying an ink as the material of the light reflecting portions 22, for example, the applied ink extends isotropically, and the outline dimension of the light reflecting portions 22 becomes constant. That is, by making the outline dimension of the unit regions 24A constant, it becomes possible to easily allocate the light reflecting portions 22 to the unit regions 24A using ink, and to achieve high productivity.

The light reflecting portions 22 and the light transmissive portions 23 are randomly allocated with respect to the unit regions 24A. In this way, the light reflecting portions 22 and the light transmissive portions 23 allocated to the unit regions 24A are even less readily visually recognizable as localized dark portions or bright portions. The light reflecting portions 22 and the light transmissive portions 23 may be randomly allocate to the unit regions 24A as follows. For example, random number values are set in the unit regions 24A. If the random number values in the unit regions 24A are less than or equal to the area ratio of the light reflecting portions 22 that has been set, the light reflecting portions 22 are allocated. If the random number values are greater than the area ratio of the light reflecting portions 22, the light transmissive portions 23 are allocated.

When the distance from the center O of the unit LED regions 24 is d, the maximum distance from the center O of the unit LED region 24 is de, the area ratio of the unit regions 24A positioned in the center O of the unit LED region 24 is Sc, and the area ratio of the unit regions 24A at the maximum distance from the center O of the unit LED regions 24 is Se, the light reflecting portions 22 have the distribution of the area ratio S in the unit regions 24A according to expression (1) described above. In this way, the area ratio of the light reflecting portions 22 in the unit regions 24A positioned at the distance d from the center O of the unit LED regions 24 is unambiguously determined by setting the values of: the maximum distance de from the center O of the unit LED region 24; the area ratio Sc of the unit regions 24A positioned in the center O of the unit LED region 24; and the area ratio Se of the unit regions 24A at the maximum distance from the center O of the unit LED regions 24. In this way, as the distance d from the center O of the unit LED region 24 changes, the area ratio S of the light reflecting portions 22 in each of the unit regions 24A linearly changes.

When the distance of the unit LED regions 24 from the center O is d, the maximum distance from the center O of the unit LED region 24 is de, the area ratio of the unit regions 24A positioned in the center O of the unit LED region 24 is Sc, and the area ratio of the unit regions 24A at the maximum distance from the center O of the unit LED regions 24 is Se, the light reflecting portions 22 have the distribution of the area ratio S in the unit regions 24A according to expression (2) described above. In this way, the area ratio of the light reflecting portions 22 in the unit regions 24A positioned at the distance d from the center O of the unit LED regions 24 is unambiguously determined by setting the values of: the maximum distance de from the center O of the unit LED region 24; the area ratio Sc of the unit regions 24A positioned in the center O of the unit LED region 24; the area ratio Se of the unit regions 24A at the maximum distance from the center O of the unit LED regions 24. In this way, as the distance d from the center O of the unit LED region 24 changes, the area ratio S of the light reflecting portions 22 in each of the unit regions 24A changes in a curving manner change, wherein the curve is a quadratic curve.

When the distance of the unit LED regions 24 from the center O is d, the maximum distance from the center O of the unit LED region 24 is de, the area ratio of the unit regions 24A positioned in the center O of the unit LED region 24 is Sc, and the area ratio of the unit regions 24A at the maximum distance from the center O of the unit LED regions 24 is Se, the light reflecting portions 22 have the distribution of the area ratio S in the unit regions 24A according to expression (3) described above. In this way, the area ratio of the light reflecting portions 22 in the unit regions 24A positioned at the distance d from the center O of the unit LED regions 24 is unambiguously determined by setting the values of: the maximum distance de from the center O of the unit LED region 24; the area ratio Sc of the unit regions 24A positioned in the center O of the unit LED region 24; and the area ratio Se of the unit regions 24A at the maximum distance from the center O of the unit LED regions 24. Thus, as the distance d from the center O of the unit LED region 24 changes, the area ratio S of the light reflecting portions 22 in each of the unit regions 24A changes in a curving manner, wherein the curve is a Gaussian curve.

The reflector 17 includes the transmissive substrate 21 transmissive to light. The light reflecting portions 22 are partially formed on the plate surface of the transmissive substrate 21. The light transmissive portions 23 are provided by the portions of the transmissive substrate 21 in which the light reflecting portions 22 are not formed. Thus, the light reflecting portions 22 can be partially formed by applying an ink and the like to the plate surface of the transmissive substrate 21, leaving the portions of the transmissive substrate 21 in which the ink and the like is not applied as the light transmissive portions 23. In this way, the reflector 17 can be produced easily, and production cost can be reduced in a preferable manner. This is useful when, in particular, the light reflecting portions 22 and the light transmissive portions 23 have complicated arrangement patterns.

According to the present embodiment, the liquid crystal display device (display device) 10 includes the backlight device 12 described above, and the liquid crystal panel (display panel) 11 for displaying an image using the light irradiated from the backlight device 12. In the liquid crystal display device 10, luminance unevenness is suppressed in the exit light from the backlight device 12, whereby high display quality can be obtained.

Second Embodiment

A second embodiment of the technology described herein will be described with reference to FIG. 9. In the second embodiment, the planar shape of unit regions 124A is modified. Redundant descriptions of structures, operations, and effects similar to those of the first embodiment will be omitted.

Figure 9:
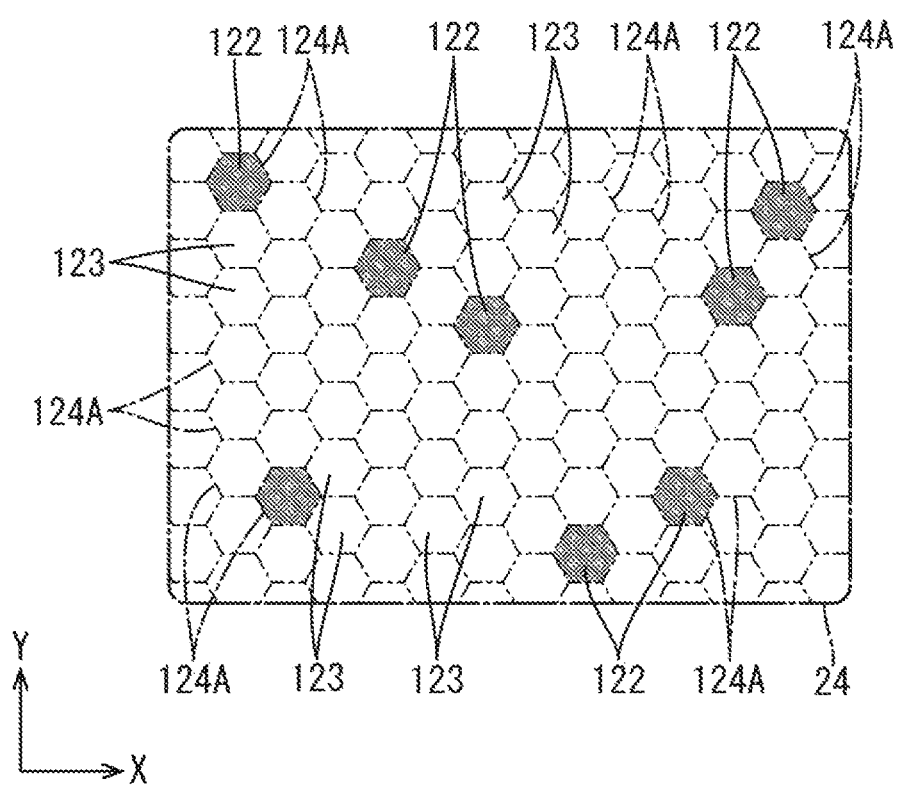
FIG. 9 is a plan view of an outer end region according to the second embodiment.

As illustrated in FIG. 9, according to the present embodiment, the unit regions 124A have a regular hexagonal planar shape. In this way, the unit regions 124A are arranged in a honeycomb shape. Accordingly, light reflecting portions 122 and light transmissive portions 123 allocated to the unit regions 124A are even less readily visually recognizable as localized dark portions or bright portions.

Third Embodiment

A third embodiment of the technology described herein will be described with reference to FIG. 10. In the third embodiment, the configuration of a transmissive substrate 221 is modified from that of the first embodiment. Redundant descriptions of structures, operations, and effects similar to those of the first embodiment will be omitted.

Figure 10:
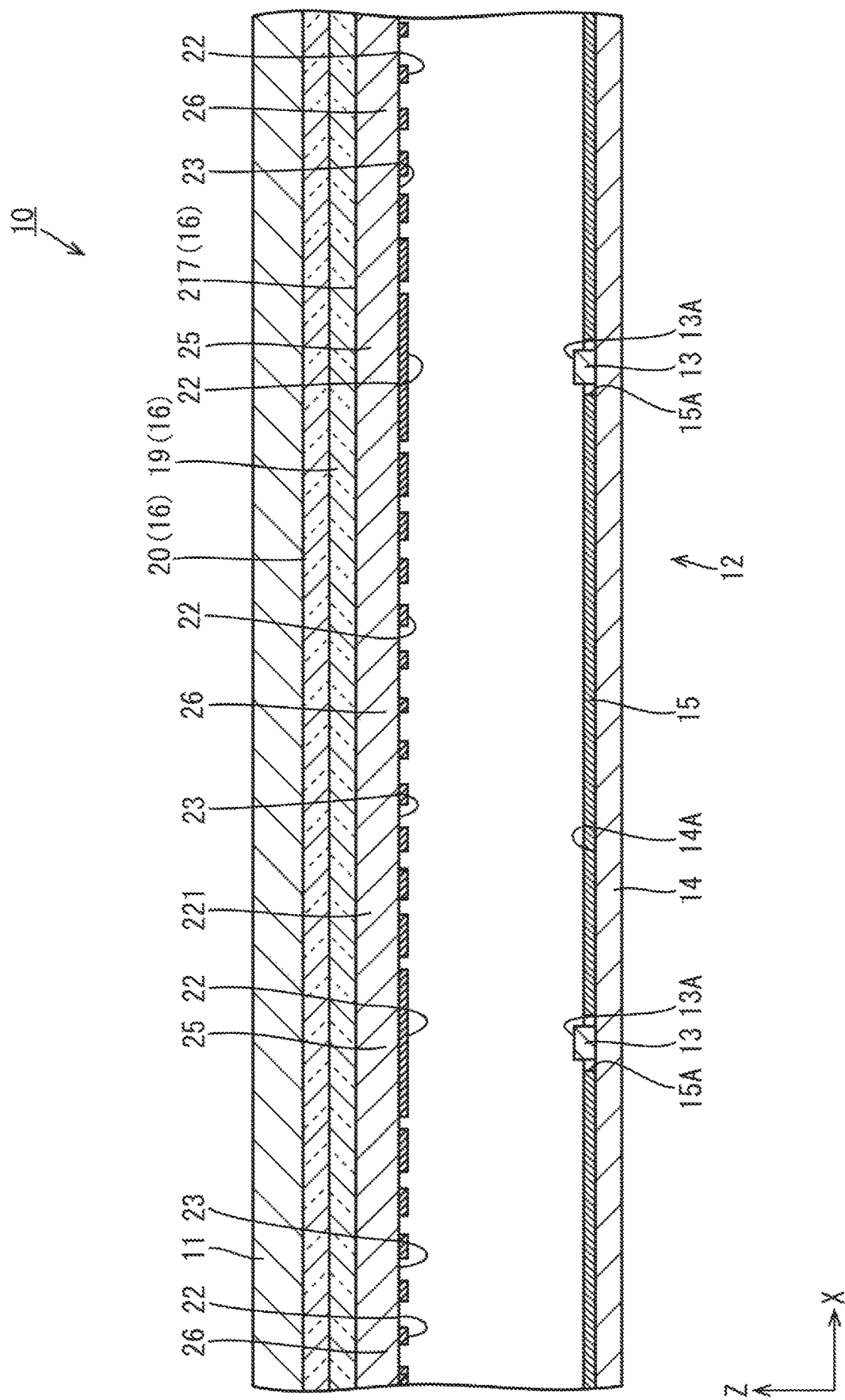
FIG. 10 is a cross sectional view of a liquid crystal display device according to the third embodiment.

As illustrated in FIG. 10, in a reflector 217 according to the present embodiment, a transmissive substrate 221 contains a diffusing material for diffusing light. In this way, light is diffused by the diffusing material contained in the transmissive substrate 221, whereby the need to separately prepare a diffusion sheet (diffusion plate) with the light diffusing function can be eliminated. In this way, the number of components and the thickness can be reduced in a preferable manner.

Fourth Embodiment

A fourth embodiment of the technology described herein will be described with reference to FIG. 11. In the fourth embodiment, the configuration of a reflector 317 is modified from that of the first embodiment. Redundant descriptions of structures, operations, and effects similar to those of the first embodiment will be omitted.

Figure 11:
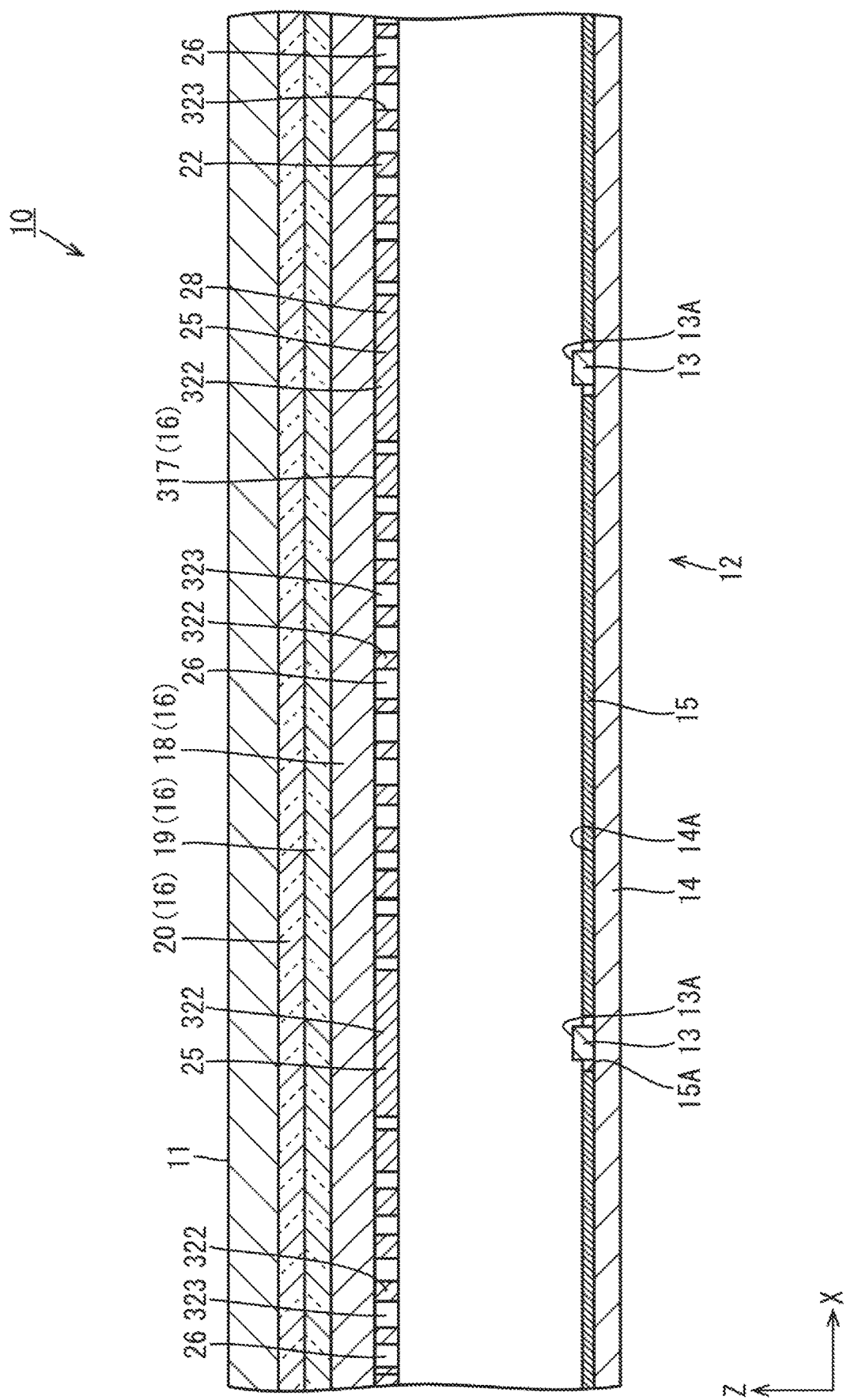
FIG. 11 is a cross sectional view of a liquid crystal display device according to the fourth embodiment.

As illustrated in FIG. 11, the reflector 317 according to the present embodiment includes a reflective substrate 28 made of synthetic resin and reflecting light. The reflective substrate 28 has a white plate surface for high optical reflectivity. Light transmissive portions 323 are formed by partially opening the reflective substrate 28. On the other hand, light reflecting portions 322 are provided by portions of the reflective substrate 28 in which the light transmissive portions 323 (openings) are not formed. The openings for the light transmissive portions 323 are formed penetrating through the reflective substrate 28 in the Z-axis direction (plate thickness direction). Thus, the light transmissive portions 323 can be formed by partially opening the reflective substrate 28, leaving the portions of the reflective substrate 28 that are not opened for the light reflecting portions 322. In this way, the light transmissive portions 323 formed by the openings in the reflective substrate 28 have high position accuracy and dimensional accuracy. Accordingly, the light reflecting portions 322 and the light transmissive portions 323 can provide the light reflecting performance and light transmitting performance in an appropriate manner.

Other Embodiments

The technology described herein is not limited to the embodiments described above and with reference to the drawings. The following embodiments may be included in the technical scope.

Figure 12:
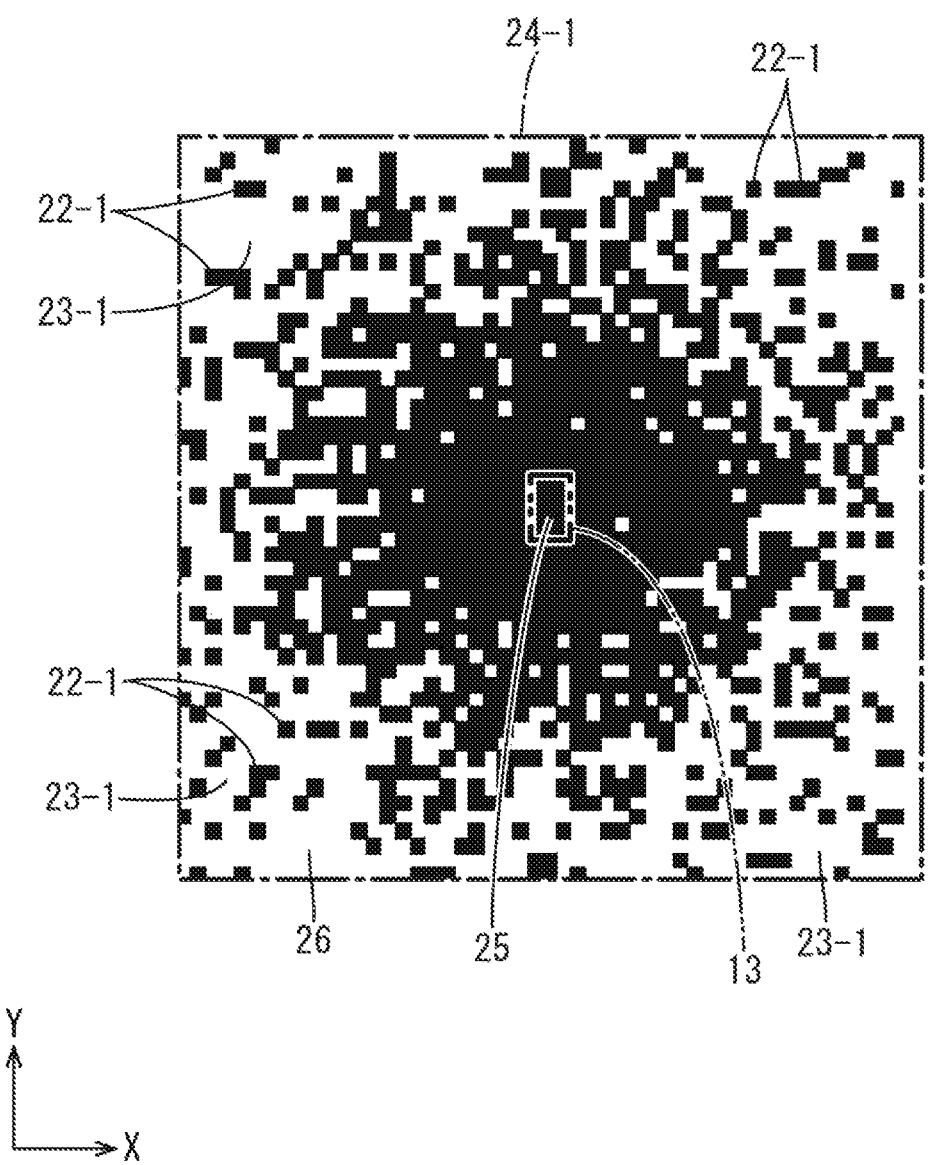
FIG. 12 is a plan view of the unit LED region in a reflector according to another embodiment (1).

(1) In a modification of the first embodiment, a unit LED region 24-1 may have light reflecting portions 22-1 and light transmissive portions 23-1 distributed as illustrated in FIG. 12. In this case, also, the light reflecting portions 22-1 and the light transmissive portions 23-1 have a non-point-symmetric distribution.

(2) Other than as described in (1) above, the specific distribution of the light reflecting portions and the light transmissive portions in the unit LED region may be modified, as appropriate.

(3) It is also possible to determine the area ratio of the light reflecting portions using a mathematical expression relating to the distribution, other than expression (1) to expression (3).

(4) Other than as in the embodiments described above, the specific planar shape of the unit region may be modified, as appropriate. For example, the planar shape may be regular triangle, parallelogram, regular pentagon, regular octagon, or other regular polygons. The planar shape of the unit region may be non-regular polygons, such as non-regular triangle, rectangle, or trapezoid, or non-polygons such as circular or elliptic.

(5) Other than as in the embodiments described above, the specific outline dimension of the unit region may be modified, as appropriate. In this case, also, the outline dimension of the unit region may preferably be in a range of from 0.05 mm to 0.5 mm; this, however, is not limiting. For example, when it became possible to form the light reflecting portions measuring less than 0.05 mm due to the advance made in printing technology, the outline dimension of the unit region may be made less than 0.05 mm.

(6) It is also possible to set multiple types of unit regions differing in planar shape or outline dimension (size).

(7) The value of the area ratio of the light reflecting portions in the LED-overlapping region may be less than 100%.

(8) The specific numerical value of the area ratio of the light reflecting portions in the outer end region may be modified, as appropriate. In this case, also, the area ratio of the light reflecting portions in the outer end region may preferably be in a range of from 0% to 20%; this, however, is not limiting.

(9) Other than as in the embodiments described above, the specific planar shape, outline dimension and the like of the unit LED region may be modified, as appropriate. Similarly, the specific planar shape, outline dimension (relative size with respect to the unit LED region or the unit region) and the like of the LEDs may be modified, as appropriate.

(10) The light reflecting portions and the light transmissive portions may be arranged with a certain regularity, as long as the distribution of the light reflecting portions and the light transmissive portions in the unit LED region is non-point-symmetric.

(11) It is also possible to form the light reflecting portions on the front-side plate surface of the transmissive substrate of the reflector.

(12) It is also possible to make the reflective substrate of the reflector from a metal. In this case, highly precise openings (light transmissive portions) can be formed by subjecting the reflective substrate to an etching process.

(13) Other than as in the embodiments described above, the number of the optical members, the order in which the optical members are stacked and the like may be modified, as appropriate. For example, another optical member may be interposed between the reflector and the LEDs, so that the reflector is indirectly opposed to the LEDs with the other optical member disposed therebetween.

(14) It is also possible to use organic EL and the like as the light source, in addition to the LEDs.

(15) The technology described herein is applicable to other types of display panel (such as a micro-electro-mechanical systems (MEMS) display panel), in addition to the liquid crystal panel.

The invention claimed is:

1. A lighting device comprising:
light sources disposed in a matrix along an X-Y plane of the light device; and
a reflector disposed in front of the light sources with a gap between the reflector and the light sources, the reflector including unit light source regions opposed to the light sources, respectively, each of the unit light source regions including:
a light source overlapping region at a center of the each of the unit light source regions to overlap corresponding one of the light sources, the light source overlapping region including first light reflecting portions configured to reflect some of light rays emitted by at least the corresponding one of the light sources and first light transmissive portions configured to transmit some of the light rays
a light source peripheral region around the light source overlapping region, the light source peripheral region including second light reflecting portions configured to reflect some of the light rays and second light transmissive portions configured to transmit some of the light rays, wherein
the first light reflecting portions have a total area greater than a total area of the first light transmissive portions,
the second light reflecting portions have a total area less than a total area of a second light transmissive portions,
the second light reflecting portions are disposed at irregular intervals in rows and columns,
the second light reflecting portions in each of the rows are in arrangement different from arrangement of the second light reflecting portions in adjacent one of the rows, and
the second light reflecting portions in each of the columns are in arrangement different from arrangement of the second light reflecting portions in adjacent one of the columns.

2. The lighting device according to claim 1, wherein each of the first light reflecting portions, the first light transmissive portions, the second light reflecting portions, and the second light transmissive portions has a rectangular shape with dimensions in a range from 0.05 mm to 0.5 mm.

3. The lighting device according to claim 2, wherein the dimensions of the first light reflecting portions, the first light transmissive portions, the second light reflecting portions, and the second light transmissive portions are equal to each other.

4. The lighting device according to claim 1, wherein
the light source peripheral region includes an outer edge section including an outer edge located at a maximum distance from the center of the each of the unit light source regions, and
the second light reflecting portions in the outer edge section have a total area with a proportion in an area of the outer edge section in a range from 0% to 20%.

5. The lighting device according to claim 1, wherein each of the first light reflecting portions, the first light transmissive portions, the second light reflecting portions, and the second light transmissive portions has a regular hexagonal shape.

6. The lighting device according to claim 1, wherein
the first light reflecting portions and the second light reflecting portions are disposed such that a proportion of a total area of the first light reflecting portions and the second light reflecting portions in an area of the each of the unit light source regions satisfies equation (1):

$$S=(Se-100)\cdot d/de+Sc \qquad (1)$$

where S is the proportion of the total area of the first light reflecting portions and the second light reflecting portions, d is a distance from the center of the each of the unit light source regions, de is a maximum distance from the center of the each of the unit light source regions, Sc is a proportion of a total area of the first light reflecting portions in an area of a center section of the each of the unit light source regions at the center of the each of the unit light source regions, and Se is a proportion of a total area of the second light reflecting portions in an area of an outer edge section including an outer edge at the maximum distance from the center of the each of the unit light source regions.

7. The lighting device according to claim 1, wherein
the first light reflecting portions and the second light reflecting portions are disposed such that a proportion of a total area of the first light reflecting portions and the second light reflecting portions in an area of the each of the unit light source regions satisfies equation (2):

$$S=(Se-100)\cdot d^2/de^2+Sc \qquad (2)$$

where S is the proportion of the total area of the first light reflecting portions and the second light reflecting portions, d is a distance from the center of the each of the unit light source regions, de is a maximum distance from the center of the each of the unit light source regions, Sc is a proportion of a total area of the first light reflecting portions in an area of a center section of the each of the unit light source regions at the center of the each of the unit light source regions, and Se is a proportion of a total area of the second light reflecting portions in an area of an outer edge section including an outer edge at the maximum distance from the center of the each of the unit light source regions.

8. The lighting device according to claim 1, wherein
the first light reflecting portions and the second light reflecting portions are disposed such that a proportion of a total area of the first light reflecting portions and the second light reflecting portions in an area of the each of the unit light source regions satisfies equation (3):

$$S = Sc \cdot \exp(d^2 \cdot \log(Se/100)/de^2) \quad (3)$$

where S is the proportion of the total area of the first light reflecting portions and the second light reflecting portions, d is a distance from the center of the each of the unit light source regions, de is a maximum distance from the center of the each of the unit light source regions, Sc is a proportion of a total area of the first light reflecting portions in an area of a center section of the each of the unit light source regions at the center of the each of the unit light source regions, and Se is a proportion of a total area of the second light reflecting portions in an area of an outer edge section including an outer edge at the maximum distance from the center of the each of the unit light source regions.

9. The lighting device according to claim 1, wherein
the reflector includes a transmissive substrate that transmits the light rays,
the transmissive substrate includes a plate surface opposed to the light sources and including sections separated from each other,
the light reflecting portions are disposed in the sections of the plate surface of the transmissive substrate, and
the light transmissive portions include sections of the plate surface of the transmissive substrate in which the light reflecting portions are not disposed.

10. The lighting device according to claim 9, wherein the transmissive substrate of the reflector contains a diffusing material diffusing light.

11. The lighting device according to claim 1, wherein
the reflector includes a reflective substrate that reflects light,
the reflective substrate includes through holes that are defined as the light transmissive portions, and
the reflective substrate includes portions in which the through holes are not provided and defined as the light reflecting portions.

12. A display device comprising:
the lighting device according to claim 1; and
a display panel configured to display an image using the light rays from the lighting device.

13. The lighting device according to claim 1, wherein
the rows in which the second light reflecting portions are disposed include at least a first row, a second row, and a third row that are consecutive,
the second light reflecting portions in the first row are in arrangement different from arrangement of the second light reflecting portions in the second row and arrangement of the second light reflecting portions in the third row, and
the arrangement of the second light reflecting portions in the second row is different from the arrangement of the second light reflecting portion in the third row.

14. The lighting device according to claim 1, wherein
the columns in which the second light reflecting portions are disposed include at least a first column, a second column, and a third column that are consecutive,
the second light reflecting portions in the first column are in arrangement different from arrangement of the second light reflecting portions in the second column and arrangement of the second light reflecting portions in the third column, and the arrangement of the second light reflecting portions in the second column is different from the arrangement of the second light reflecting portion in the third column.

15. A lighting device comprising:
light sources disposed in a matrix along an X-Y plane of the lighting device; and
a reflector disposed in front of the light sources with a gap between the reflector and the light sources, the reflector including unit light source regions opposed to the light sources, respectively, each of the unit light source regions including:
a light source overlapping region at a center of the each of the unit light source regions to overlap corresponding one of the light sources, the light source overlapping region including first light reflecting portions configured to reflect some of light rays emitted by at least the corresponding one of the light sources; and
a light source peripheral region around the light source overlapping region, the light source peripheral region including second light reflecting portions configured to reflect some of the light rays and light transmissive portions configured to transmit some of the light rays, wherein
the second light reflecting portions have a total area less than a total area of the light transmissive portions,
the second light reflecting portions are disposed at irregular intervals in rows and columns,
the second light reflecting portions in each of the rows are in arrangement different from arrangement of the second light reflecting portions in adjacent one of the rows, and
the second light reflecting portions in each of the columns are in arrangement different from arrangement of the second light reflecting portions in adjacent one of the columns.

16. The lighting device according to claim 15, wherein
each of the first light reflecting portions, the second light reflecting portions, and the light transmissive portions has a square shape,
the first light reflecting portions, the second light reflecting portions, and the light transmissive portions have dimensions equal to each other, and
the first light reflecting portions are coupled to each other without gaps to fill the light source overlapping region.

17. The lighting device according to claim 16, wherein
the rows in which the second light reflecting portions are disposed include at least a first row, a second row, and a third row that are consecutive,
the second light reflecting portions in the first row are in arrangement different from arrangement of the second light reflecting portions in the second row and arrangement of the second light reflecting portions in the third row, and
the arrangement of the second light reflecting portions in the second row is different from the arrangement of the second light reflecting portion in the third row.

18. The lighting device according to claim 16, wherein
the columns in which the second light reflecting portions are disposed include at least a first column, a second column, and a third column that are consecutive,
the second light reflecting portions in the first column are in arrangement different from arrangement of the second light reflecting portions in the second column and arrangement of the second light reflecting portions in the third column, and the arrangement of the second light reflecting portions in the second column is different from the arrangement of the second light reflecting portion in the third column.

* * * * *